United States Patent
Prasannavenkatesan (12) United States Patent (10) Patent No.: US 11,148,199 B2
(45) Date of Patent: Oct. 19, 2021

(54) DEPOSITION OF METAL DIES FOR PART FABRICATION

(71) Applicant: Tesla, Inc., Palo Alto, CA (US)

(72) Inventor: Rajesh Prasannavenkatesan, San Jose, CA (US)

(73) Assignee: Tesla, Inc., Palo Alto, CA (US)

( * ) Notice: Subject to any disclaimer, the term of this patent is extended or adjusted under 35 U.S.C. 154(b) by 1367 days.

(21) Appl. No.: 15/223,846

(22) Filed: Jul. 29, 2016

(65) Prior Publication Data

US 2018/0029132 A1   Feb. 1, 2018

(51) Int. Cl.
| | |
|---|---|
| *B22F 5/00* | (2006.01) |
| *B22C 9/06* | (2006.01) |
| *B22F 3/24* | (2006.01) |
| *B33Y 10/00* | (2015.01) |
| *B33Y 80/00* | (2015.01) |
| *B22F 10/20* | (2021.01) |

(52) U.S. Cl.
CPC ............... *B22F 5/007* (2013.01); *B22C 9/06* (2013.01); *B22F 3/24* (2013.01); *B22F 10/20* (2021.01); *B33Y 10/00* (2014.12); *B33Y 80/00* (2014.12); *B22F 2003/247* (2013.01); *B22F 2998/10* (2013.01); *Y02P 10/25* (2015.11)

(58) Field of Classification Search
CPC ...... B22F 5/00; B22F 3/10; B22F 3/24; B22C 9/06; B33Y 10/00; B33Y 80/00
USPC ................ 219/121.12–121.35, 121.6–121.86
See application file for complete search history.

(56) References Cited

U.S. PATENT DOCUMENTS

| | | | | |
|---|---|---|---|---|
| 1,936,339 | A * | 11/1933 | Stevens | B21J 13/02 72/475 |
| 3,548,173 | A * | 12/1970 | Hopwood, Jr. | G05B 19/4205 700/88 |
| 3,860,803 | A * | 1/1975 | Levine | B21D 37/20 700/98 |
| 7,073,561 | B1 * | 7/2006 | Henn | B82Y 30/00 164/94 |
| 2008/0000611 | A1 * | 1/2008 | Bunker | B22C 9/22 164/138 |
| 2008/0173386 | A1 * | 7/2008 | Clark | B23K 35/3033 156/73.1 |
| 2013/0221192 | A1 * | 8/2013 | Rocco | B22C 9/12 249/177 |
| 2013/0255346 | A1 * | 10/2013 | Danby | B21D 37/01 72/352 |
| 2014/0242539 | A1 * | 8/2014 | Fisker | A61C 13/0004 433/54 |
| 2014/0255198 | A1 * | 9/2014 | El-Wardany | F01D 25/005 416/229 A |

(Continued)

*Primary Examiner* — Geoffrey S Evans
(74) *Attorney, Agent, or Firm* — Knobbe, Martens, Olson & Bear, LLP (57) ABSTRACT

A method for synthesizing parts using a die comprising: providing a three-dimensional model; converting the three-dimensional model into G-code; executing the G-code to deposit a metal die; determining whether one or more dimensions of the metal die are within predetermined tolerance levels; based on the determination, milling the die if the one or more dimensions are not within predetermined tolerance levels or depositing additional metal if the one or more dimensions are not within predetermined tolerance levels; and synthesizing a part using the metal die.

23 Claims, 8 Drawing Sheets

(56) References Cited

U.S. PATENT DOCUMENTS

| | | | |
|---|---|---|---|
| 2015/0024233 A1* | 1/2015 | Gunther | B29C 64/153 428/601 |
| 2015/0089992 A1* | 4/2015 | Amtmann | B22F 5/007 72/470 |
| 2015/0350278 A1* | 12/2015 | Isbjornssund | H04L 9/00 700/98 |
| 2016/0019270 A1* | 1/2016 | Jones | G05B 19/4097 700/98 |
| 2016/0069677 A1* | 3/2016 | Garvey | G01B 21/04 33/503 |
| 2016/0298203 A1* | 10/2016 | Hackel | C21D 9/0068 |
| 2017/0043518 A1* | 2/2017 | Narayanaswamy | B33Y 10/00 |
| 2017/0052516 A1* | 2/2017 | Minardi | G05B 15/02 |
| 2017/0057011 A1* | 3/2017 | Hyatt | B23K 26/342 |
| 2017/0157841 A1* | 6/2017 | Green | B33Y 10/00 |

\* cited by examiner

DEPOSITION OF METAL DIES FOR PART FABRICATION

TECHNICAL FIELD

The present disclosure relates to the deposition of metal dies, which may be used for the fabrication of metal parts, composite parts, and plastic molding.

BACKGROUND

It is desirable that dies used in the automobile industry (and other industries that require repetitive production of parts) are of materials that are rigid and durable. These dies are expensive and require significant time to make as they are typically made from large molds, also known as casts. Typically, a large mold must first be made, and then the surface of the die must be accurately machined to shape the die into the appropriate shape. Improper machining may result in the need to form another die using the mold. Problems detected in the mold form may result in the necessity to create a new mold, which causes significant delays.

Accordingly, a need exists to improve the making of dies that overcomes problems with conventional methods and systems.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Processes and systems are provided for producing metal parts, such as metal dies, using metal-deposition techniques. In certain embodiments, a method exists for synthesizing parts using a die. The die is formed through a process converts a three-dimensional model into G-code. The G-code is executed causing a metal die to be deposited. To ensure that the dimensions of the die are within predetermined tolerance levels measurements are performed. If the measurements indicate that the dimensions of the die are outside of tolerance levels, additional metal is deposited or material is milled, as necessary until the dimensions are within tolerance levels. In certain embodiments, the die is then used to stamp parts. In certain embodiments, the die is used to form metal, composite, or plastic parts. In certain embodiments, the die is used to form plastic parts using plastic molding. In certain embodiments, the die is used as part of a die casting process to form metal or composite parts.

An advantage of the current disclosure is that faster design iterations are possible. Depositing a metal die while ensuring that the die and produces parts are within acceptable tolerance levels allows for faster design iteration. A part can be synthesized using this present disclosure and the design can be tested for applicability. Designs that produce acceptable parts may be placed into production. Designs that produce undesirable designs may be rejected. Multiple iterations are possible using the present disclosure in the time it takes through conventional routes.

The systems and methods described in the present disclosure may provide a variety of technical advantages. Automobile manufacturers have been researching different ways to produce dies faster and produce dies that have improved wear during the stamping process, resulting in a longer lasting die. Certain embodiments described herein reduce the time to form the dies through iterative deposition and milling steps.

Certain embodiments also produce dies using robust materials that improve wear. Researchers have made different attempts to make stamping dies using mass castable polymers. Other researchers have used zinc in an attempt to increase the durability and useful life of the polymer die. However, zinc (along with other low-melting point metals) is relatively soft. Thus, harder metals may be desirable to increase die durability and useful life. Dies made according to certain embodiments use harder metals, such as 0.4 wt % C steel, 4140 steel, 4130 steel, P20 steel, H13 steel, aluminum, and titanium.

Certain embodiments also increase manufacturing productivity. One avenue in which productivity is increased is in the creation of dies for large-scale parts manufacturing. In certain embodiments, dies fabricated using various embodiments stamp parts, resulting in stamped parts that have dimensions within desired tolerance levels. In certain embodiments, the die is used to form metal, composite, or plastic parts that are within desired tolerance levels. In certain embodiments, the die is used to form plastic parts using plastic molding. In certain embodiments, the die is used as part of a die casting process to form metal or composite parts.

In the automobile industry, it is particularly important to produce highly-consistent parts, that is parts with relatively low tolerance levels, in as fast a time as possible.

Figure 1:
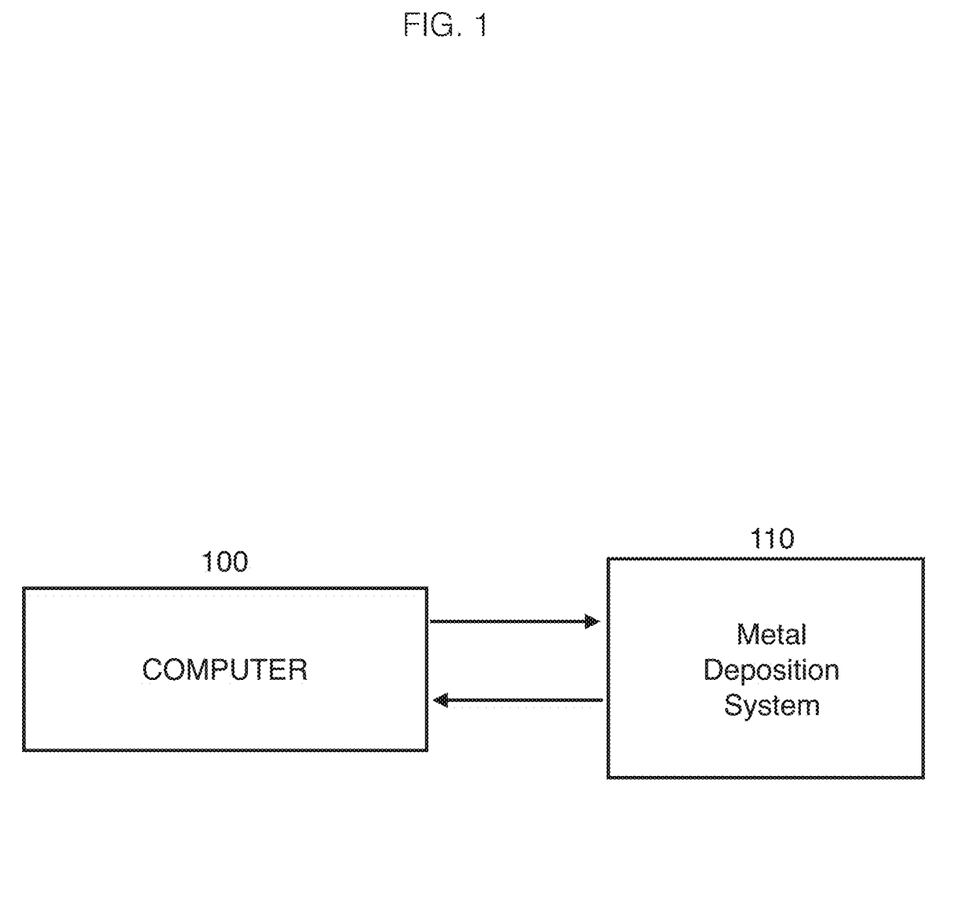
FIG. 1 is a block diagram of an exemplary system that can be used to practice one or more embodiments of the disclosed technologies.

FIG. 1 is a block diagram of an exemplary system that can be used to practice one or more embodiments of the invention. A computer 100 is compatible with computer-aided-design (CAD) files and operations. Computer 100 can be programmed, or otherwise used, to implement the technologies disclosed in the present application. In certain embodiments, computer 100 is used to create a three-dimensional (3D) model of a die using CAD techniques. CAD software for mechanical design typically uses either vector-based graphics or raster graphics. CAD models output or convey information, such as materials to be used, dimensions, and tolerances levels. CAD models may be solids in three-dimensional (3D) space. The CAD software may be commercially available or may be proprietary software.

In certain embodiments, computer 100 uses a CAD model to generate G-code (or G programming language or RS-274). The output of the CAD software are drawings and solid models that can be contained in digital files. Computer-aided manufacturing (CAM) software analyzes the CAD model, takes inputs from a user (such as a technician, machinist, or programmer) and outputs G-code that controls the machine. The CAM software may be commercially available or may be proprietary software. The CAM software may also be part of the CAD software. Alternatively, instead of CAM software, slicer software may analyze the CAD file to generate the G-code. The slicer software may be commercially available or may be proprietary software. Thus, the CAD file, analyzed by either CAM or slicer software results in G-code. The G-code controls a metal deposition system 110. In certain embodiments, the G-code is executed by computer 100. In certain embodiments, the G-code is executed by a component within the metal deposition system 110. In certain embodiments, the metal deposition system 110 may convert the CAD model to G-code using either CAM software or slicer software.

Metal deposition system 110 may employ one or more deposition techniques. Deposition techniques include powder bed deposition, laser metal powder deposition, and electron beam wire deposition. Typically the materials used by metal deposition system 110 must be weldable. These materials include steel with 0.4 wt % C, 4140 steel, 4130 steel, P20, H13 steel, nickel, cobalt, and nickel/cobalt alloy.

In certain embodiments, the metal deposition system 110 uses a powder bed deposition. Powder bed deposition allows for deposition rates of approximately 0.2 kg/hr and a resolution of approximately 30 microns. Maximum build volumes can range from approximately 250×250×250 mm$^3$ to 800×400×500 mm$^3$. The present disclosure is compatible with maximum build volumes of all sizes, including larger build volumes.

Powder bed deposition may use one of many different techniques to sinter together the metal particles, include direct metal laser sintering ("DMLS") and electron beam melting ("EBM"). In DMLS, there is a heat source, such as a laser, to fuse the material, a method to control the heat source (such as a computer), and a mechanism to add new layers of unused powder material over previously formed layers. In the DMLS process, the powder material is sintered layer by layer, and different engineering metals may be used in the process.

In EBM, an electron beam is used as the heat source to melt the metal powder when adding layers to the forming part or die. Electromagnetic coils may be used to control the beam. A computer may be used to control the electromagnetic coils. EBM typically operates under a reduced pressure, relative to atmospheric pressure.

In both DMLS and EBM, post processing includes removing excess powder and further cleaning the fabricated part or die. Post processing can include melting of the fabricated part/die or hot isotactic pressing to increase the density. However, both typically result in alterations of the dimensions.

In certain embodiments, the metal deposition system 110 uses electron beam wire deposition ("EBWD"). EBWD may be used to produce large-scale, high-value metal parts. Metals used in EBWD include, but are not limited to, the metals discussed in this disclosure. In addition, aluminum, titanium, tantalum, steel, nickel, and nickel alloys may be used.

In certain embodiments, a metal die may be produced using EBWD. In certain embodiments, a 3D model may be generated in a computer-aided drafting ("CAD") program. Using the 3D model and a CAD program, an electron beam may be used to deposit metal, using a metal wire feedstock. The metal is deposited layer by layer, until the die reaches near the desired shape. At this point, the die is ready for heat treatment and finish machining. According to certain embodiments of the present invention, if the finish machining produces a die that has dimensions that do not meet the minimum dimension, within tolerance, EBWD may be used to add additional layers to increase the dimensions.

In addition to single metals, two wire feeds may be used to allow alloys to be created. Wires of two different metals may be used, which results in the ability to create dies made of custom alloys or ingots. Depending on the desired alloy, the rate at which the wires are fed may be changed, thereby changing the mixing ratio of the two metals. It is also possible to time-vary the mixing ratio, thereby creating alloys containing different percentages of metal at different layers. For example, two wire feeds may be titanium and nickel to create a nickel-titanium alloy. At time t=0, the wire feeds may be fed to produce a nickel-titanium alloy of 2.5% nickel by weight. At a later time, after multiple layers of the nickel-titanium alloy have been deposited, the feeds may be adjusted to increase the weight percentage of nickel to 5% nickel by weight. In certain embodiments, the percentage of nickel may be changed gradually to produce a "graded" alloy composition for the die.

Certain metals are difficult to use in the EBWD process. For example, in certain embodiments, steel (iron and carbon) is used as one of the metal wire feeds. The steel is composed primary of iron, but it is the addition of carbon that changes the iron and provides steel with many unique and desirable properties, including hardness, ductility, and tensile strength of the resulting steel. Typically, steel may contain up to approximately 2.1% weight percent of carbon. In certain embodiments, the steel wire feed is combined with chromium to form a stainless steel alloy.

However, steel may present certain challenges to use in processing to ensure that the resulting printed part is not distorted or cracked. In certain embodiments, when steel is used as one of the wire feeds, steel demagnetizing may be necessary. Deposition of steel pieces may often result in distortion. This is due to the effects of the localized heating from the laser or electron beam (or any focused heat source used to melt and re-solidify the material) and then the rapid cooling. In certain embodiments, a heating plate is used to more finely control the heating and cooling process. The wire is heated prior to sintering using the laser. The resulting sintered material may also be heated and subsequently cooled in a controlled manner to prevent cracking.

In certain embodiments the metal deposition system 110 comprises a three-dimensional printer.

In certain embodiments, metal deposition system 110 uses laser metal powder deposition. In certain embodiments, laser metal powder deposition offers deposition rates of 1 kg/hr, resolution of 500 microns, and a max build volume of approximately 1524×1524×2133 mm$^3$. The present disclosure is compatible with maximum build volumes of all sizes, including larger build volumes.

In laser metal powder deposition, metal powder is injected into a focused beam of a high-power laser, under controlled atmospheric conditions. The focused laser beam melts the surface of the target material and generates a small molten pool of base material. The powder is delivered into the same spot where the small molten pool exists, depositing a small amount of material that may be controlled to resolution of 500 microns as described above. The resulting deposits may then be used to fabricate or repair metal parts.

In certain embodiments, the G-code operates to cause metal deposition system 110 to lay or deposit a layer of powder for a selected 2D slice (of the 3D model) using a powder head device, a powder roller, or a powder blade. For example, the powder may be laid over the entire confined region within which the selected slice is located. Once the powder is distributed, the G-code causes the distribution of the powder to be stopped. The G-code then causes a laser to heat the powder along a scan line, i.e., the first scan line of the selected 2-D slice. For simplicity in describing the operation, it is assumed that the 2-D slice is scanned in a conventional raster scan (X-Y) operation, although the scan path may differ to implement various embodiments of the invention described herein.

As each line segment is scanned, a determination is made as to whether the laser heating has occurred for all line segments of a particular scan line of the selected slice. If not, the next line segment is scanned and the laser heats the powder in that segment. When the heating of the final line segment of a particular scan line has been completed, a determination is made as to whether the scan line involved is the final scan line of the selected slice. If not, the next scan line is selected and the scanning and laser heating process for each successive line segment of such scan line of the slice is performed. When the final scan line of a particular slice has been heated, a determination is made as to whether the slice is the final slice of the overall 3-D model. If not, the next 2D slice is selected and the process is repeated beginning with the distribution of the metal powder.

Figure 5:
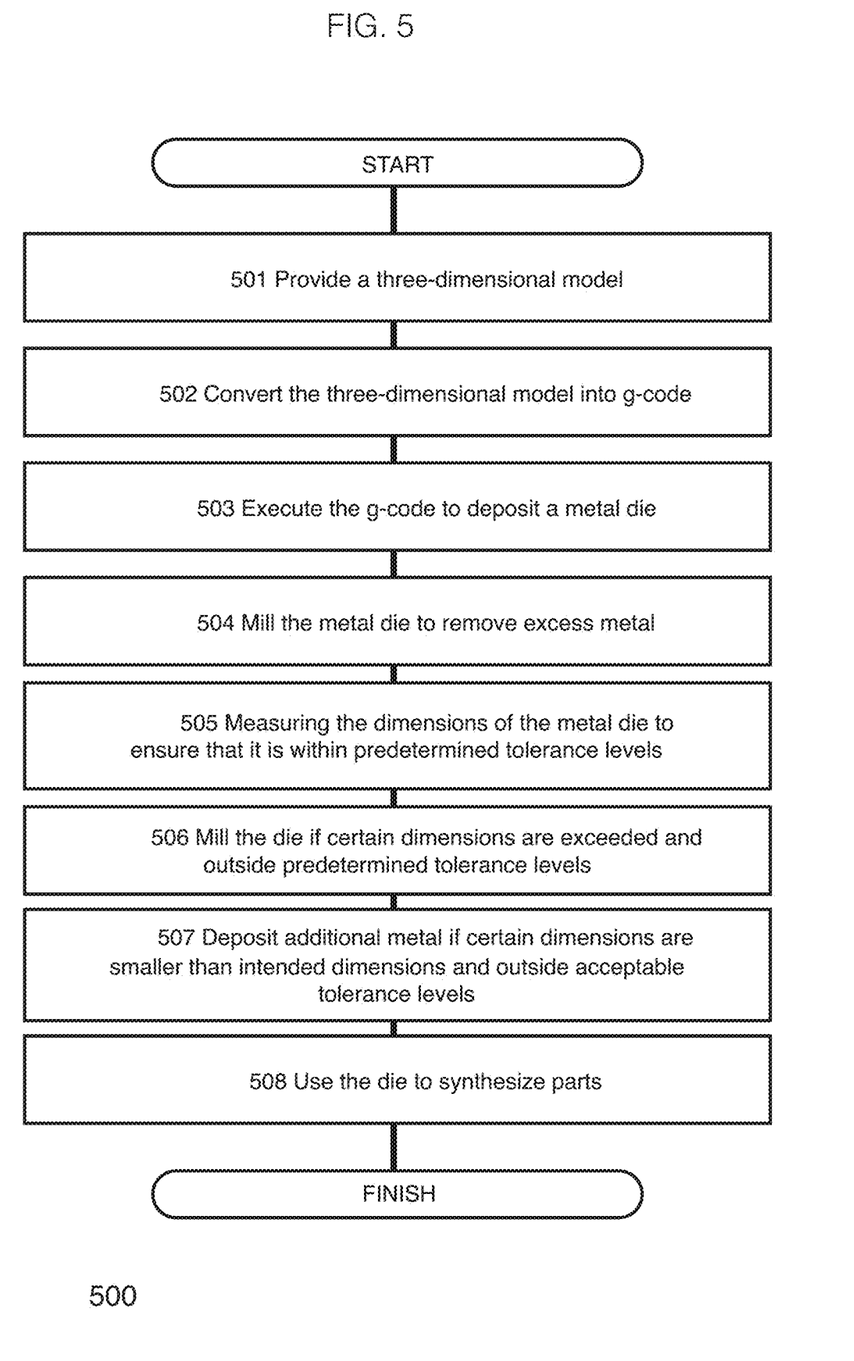
FIG. 5 is a flow chart illustrating a method for synthesizing a die and using the die to make parts according to certain embodiments of the present invention.

FIG. 5 is a flow chart illustrating a method for synthesizing a die and using the die to make parts according to certain embodiments of the present invention. With the operations of 500, a three-dimensional model is first provided (step 501). The three-dimensional model may be provided to computer 100 or metal deposition system 110. Next, the three-dimensional model is converted into G-code (step 502). This conversion may be done by either computer 100 or metal deposition system 110. The G-code is executed to control metal deposition system 110 and cause metal deposition system to deposit metal to form a metal die (step 503). Excess metal is removed from the die (step 504). The metal can be removed from the die using machine milling 320. The dimensions of the metal die can then be measured to ensure that it is within predetermined tolerance levels (step 505). The dimensions can be measured using a coordinate measuring machine (CMM) 330 as described below in relation to FIG. 3. After the dimensions have been measured, if certain dimensions are exceeded and outside predetermined tolerance levels, the die may be milled (step 506). If certain dimensions are smaller than intended dimensions and outside predetermined tolerance levels, additional material may be deposited by metal deposition system 110 (step 507). Steps 505-507 may be repeated until the measurements indicate that the dies dimensions are within predetermined tolerance levels. After steps 505-507 have been completed, the die is used to synthesize parts (step 508). In certain embodiments, a press uses the die to stamp parts. The press may be a hot stamping press. In certain embodiments, a blank is heated to cause it to be malleable. The blank may then be placed in the press for stamping the die and fabricating the part. In certain embodiments, post processing, such as a controlled press hardening or "quenching" process is performed.

In certain embodiments, the die is used to synthesize parts at step 508 that are metal, composite, or plastic parts. In certain embodiments, the die is used to form plastic parts using plastic molding. In certain embodiments, the die is used as part of a die casting process to form metal or composite parts.

In certain embodiments, steps 505-507 may be combined into a single "modifying" step in which the die is modified by either milling, metal deposition, or both until the die is within specified tolerance levels.

Figure 2:
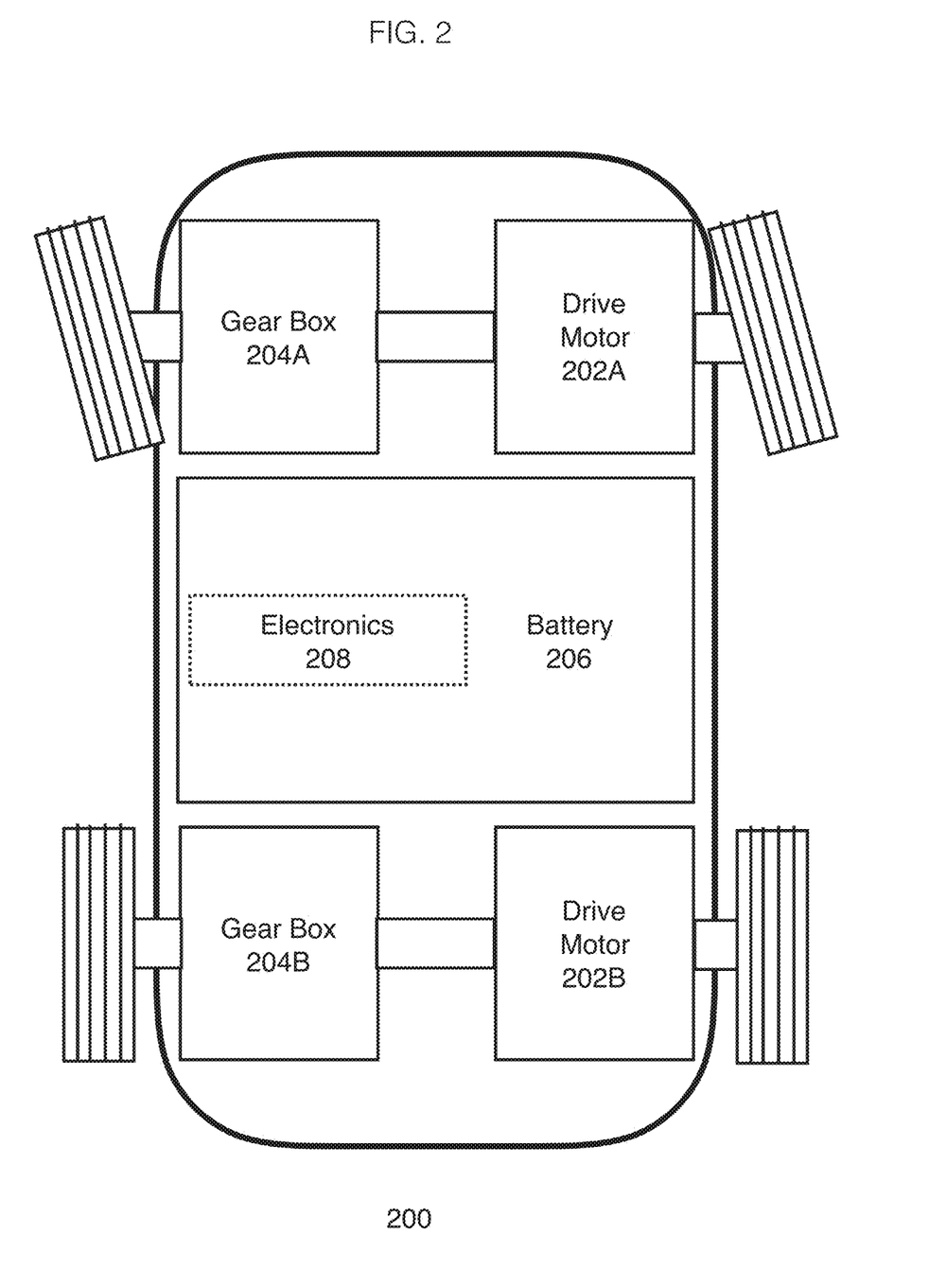
FIG. 2 illustrates the basic components of a battery powered electric vehicle, according to one embodiment.

The fabricated parts may be any metal part for use in manufacturing an electric vehicle 200 shown in FIG. 2. Parts may also be metal parts for use in manufacturing non-electric vehicles and even non-vehicle parts. For example, the parts may be A-pillars, A-pillar gussets (structural brackets), B-pillars, B-pillar gussets (structural brackets), motor housings, frame rails, A- or B-pillar reinforcements, beltline reinforcements, rocker panel reinforcements, side member reinforcements, roof rail reinforcements, fuel tank guards, transmission tunnels, mounting plate front walls, and carrier understructures.

Figure 7:
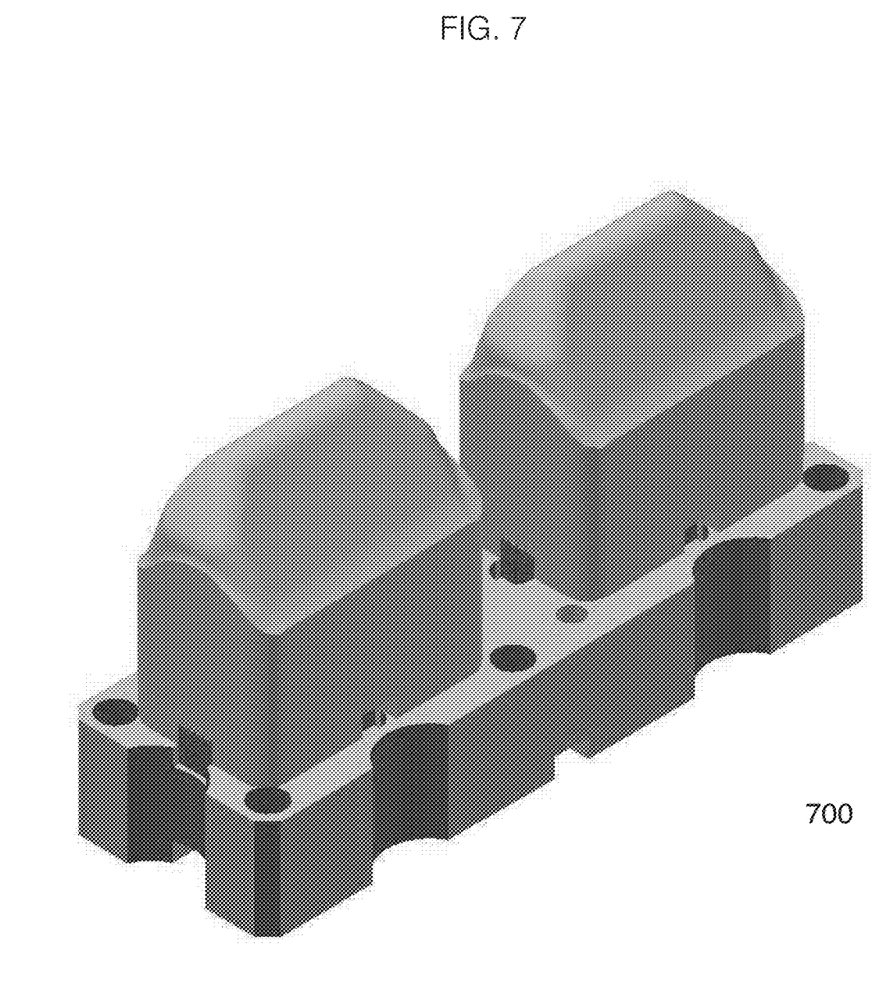
FIG. 7 is a schematic illustration of a draw-post die according to one embodiment.

FIG. 7 illustrates a die that can be fabricated when performing the method of FIG. 5. When performing the method of FIG. 5, a die 700 can be used to fabricate a parts. In certain embodiments, the die is then used to stamp parts. In certain embodiments, the die is used to form metal, composite, or plastic parts. In certain embodiments, the die is used to form plastic parts using plastic molding. In certain embodiments, the die is used as part of a die casting process to form metal or composite parts.

In certain embodiments one or more of the steps described may be omitted. For example, it may not be necessary to always mill the metal die to remove excess metal. The necessary programming required to implement the operations of FIG. 5 using the components of FIGS. 1 and 3-4 would be well within the understanding of a person of skill in the art.

In certain embodiments, after the die has been formed, an outer coating of a different metal (for example copper) is added to increase certain desirable properties, such as thermal properties or wear properties. This cladding layer can replace the need to add another layer through, for example electrodeposition or using a plating bath, in which the dimensions of the outer metal are harder to control. In certain embodiments, step 503 may include the deposition of a different outer layer of material. Subsequent steps 505-507 may deposit or mill the different outer material until the dimensions of the die are within tolerance levels.

Figure 3:
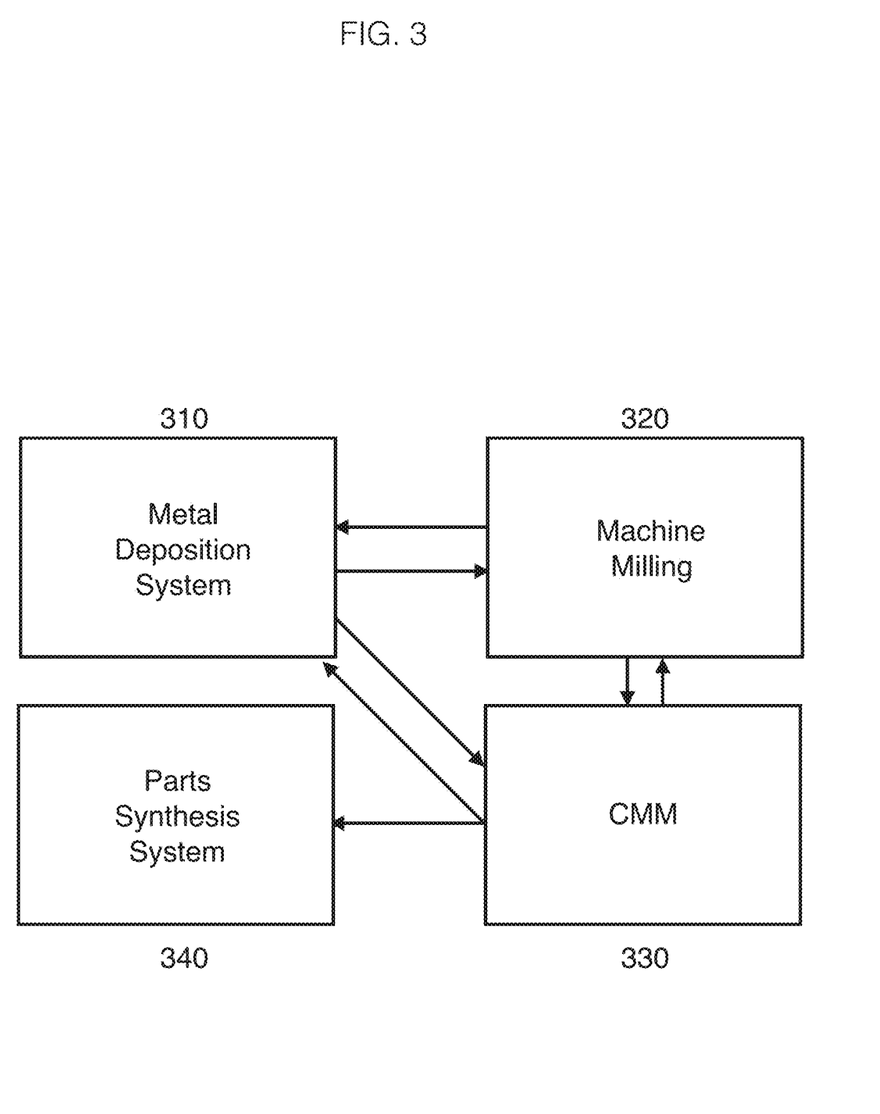
FIG. 3 is a block diagram illustrating components used in an iterative process to produce a die within predetermined tolerance levels according to certain embodiments of the present invention.

FIG. 3 is a block diagram illustrating components used in the iterative process to produce a die within predetermined tolerance levels according to certain embodiments of the present invention. A metal deposition system 310 fabricates a metal die using a deposition technique. Metal deposition system 310 may employ one or more deposition techniques. Deposition techniques include, but are not limited to, powder bed deposition, laser metal powder deposition, and electron beam wire deposition. After the die has been fabricated, including any post-processing steps, such as removing any loose powder material and any melting of the fabricated part/die or hot isotactic pressing to increase the density, the part/die is milled if any dimensions, such as determined visibly, exceed the desired dimensions of the part/die within tolerance levels. If after milling, certain dimensions of the part/die are smaller, such as determined visually, than the desired dimensions, metal deposition system 310 may be used to add additional material to increase the desired dimension.

In certain embodiments, metal deposition system 310 is used to add a second metal on top of, or around, a first metal. That is a first metal is deposited, and then a second metal is deposited. The second metal (such as copper deposited around steel) may be deposited as an outer coating to increase certain desirable properties, such as thermal properties or wear properties. This cladding layer can replace the need to add another layer through, for example electrodeposition or using a plating bath, in which the dimensions of the outer metal are harder to control.

After synthesis and any milling, coordinate measuring machine ("CMM") 330 performs measurements to ensure that the fabricated part/die is within predetermined tolerance levels. If CMM 330 determines that the part/die is not within predetermined tolerance levels, the part/die is milled again by milling machine 320. The part/die may be checked repeatedly by CMM 330 and milled by milling machine 320 until the dimensions of the part/die are not in excess of the desired dimensions within tolerance levels. If certain dimensions of the part/die become less than the desired dimensions within tolerance levels, additional layers may be added to the part/die by metal deposition system 310 to increase the dimensions. The die/part may then be milled by the milling machine 320 and checked by CMM 330.

The metal deposition system 310 may be used to add additional material to increase any dimension and the milling machine 320 may be used to remove any unwanted material. The CMM 330 may be used to check that all dimensions are within tolerance levels. In certain embodiments, milling machine 320 may perform either rough milling or fine milling depending on the need. In certain embodiments, milling machine 320 uses either climb milling or conventional milling, or both. After the CMM 330 determines that the part/die is within predetermined tolerance levels, the die may be used by a parts synthesis system 340 to synthesize parts.

In certain embodiments parts synthesis system 340 is a press. In certain embodiments parts synthesis system 340 is a hot stamping press. In certain embodiments, a blank is heated to cause it to be malleable. The blank may then be placed in the press for stamping the die and fabricating the part. In certain embodiments, post processing, such as a controlled press hardening or "quenching" process is performed.

In certain embodiments, parts synthesis system 340 is used to form metal, composite, or plastic parts that are within desired tolerance levels. In certain embodiments, parts synthesis system 340 is a plastic molder used to form plastic parts using plastic molding. In certain embodiments, parts synthesis system 340 uses the die as a cast to form metal or composite parts.

In certain embodiments of the present invention, a previously produced part may need to be altered because, for example, it has undergone wear and its features are not within the required tolerance levels of the part. The part may be milled by machine milling 320 to remove specific features of the part. After milling, metal deposition system 310 may deposit the milled (or already missing) features. In certain embodiments, metal deposition system 310 works with CMM 330 to determine which features or material must be added to make or reform the part. Such a determination may include using a CAD model or generated G-code of the part. In certain embodiments, such a CAD model or G-code is made at the time the part was made. In other embodiments, the CAD model or G-code is generated after the part was made. After metal deposition system 310 deposits metal, milling machine 320 and CMM 330 may be used to ensure that the dimensions of the part are within tolerance levels. If the part is not a die, then parts synthesis system 340 need not be used.

In certain embodiments of the present disclosure, a previously produced die may need to be altered because, for example, it has undergone wear and its features are not within the required tolerance levels of the part. The die may be milled by machine milling 320 to remove specific features of the die. After milling, metal deposition system 310 may deposit the milled (or already missing) features. In certain embodiments, metal deposition system 310 works with CMM 330 to determine which features or material must be added to make or reform the die. Such a determination may include using a CAD model or generated G-code of the die. In certain embodiments, such a CAD model or G-code is made at the time the die was made. In other embodiments, the CAD model or G-code is generated after the die was made. After metal deposition system 310 deposits metal, milling machine 320 and CMM 330 may be used to ensure that the dimensions of the part are within tolerance levels. The die may then be used in parts synthesis system 340 to synthesize parts. Parts may be any metal part for use in manufacturing electric vehicle shown in FIG. 2. Parts may also be metal parts for use in manufacturing non-electric vehicles and even non-vehicle parts. For example, a part may be an A-pillar, A-pillar gusset (structural bracket), B-pillar, B-pillar gusset (structural bracket), motor housing, frame rail, A- or B-pillar reinforcement, beltline reinforcement, rocker panel reinforcement, side member reinforcement, roof rail reinforcement, fuel tank guard, transmission tunnel, mounting plate front wall, and carrier understructure.

Each element of FIG. 3 (the metal deposition system 310, the machine milling 320, the CMM 330), and the parts synthesis system 340) may be under control of computer 100. In certain embodiments, a computer is connected to each element, or a group of elements to control the individual element of the group of elements.

Figure 4:
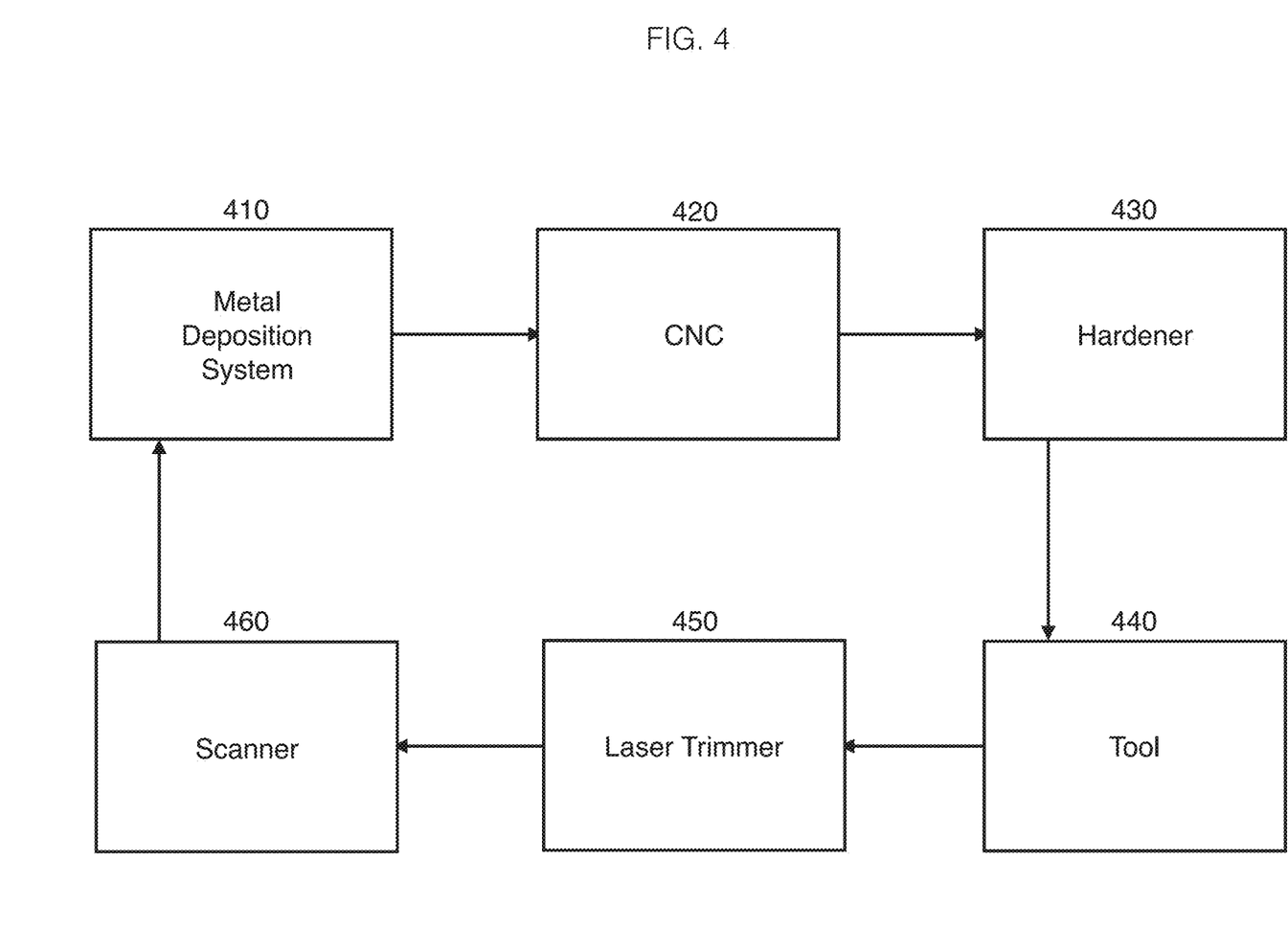
FIG. 4 is a block diagram of an exemplary system to produce a die within tolerance specifications according to certain embodiments of the present invention.

FIG. 4 is a block diagram of an exemplary system to produce a die within tolerance specifications according to certain embodiments of the present invention. A metal deposition system 410 takes a design that is controlled by a computer numerical control ("CNC") 420. Metal deposition system 410 can include systems that employ one or more deposition techniques. Deposition techniques include powder bed deposition, laser metal powder deposition, and electric beam wire deposition.

In certain embodiments, metal deposition system 410 is used to add a second metal on top of, or around, a first metal. That is a first metal is deposited, and then a second metal is deposited. The second metal may be deposited as an outer coating to increase certain desirable properties, such as thermal properties or wear properties. This cladding layer can replace the need to add another layer through, for example electrodeposition or using a plating bath, in which the dimensions of the outer metal are harder to control.

CNC machines are a common type of automated machinery. CNC machines can be controlled by a computer program to perform any task that a human operator could perform on a conventional machine, including deposition of metal materials. In certain embodiments, the CNC is a 3-axis milling machine. In certain embodiments, the CNC is a 5-axis milling machine. The CNC controls the milling of the part/die produced by the metal deposition system 410. In certain embodiments, the CNC's operating instructions include instructions based on a CAD or CAM design.

In certain embodiments, the workflow to control the CNC consists of CAD software that is used to design the parts. The CAD software may be commercially available or may be proprietary software. The output of the CAD software are drawings and solid models that can be contained in digital files. CAM software analyzes the CAD drawing, takes inputs from a user (such as a technician, machinist, or programmer) and outputs G-code that controls the machine. The CAM software may be commercially available or may be proprietary software. The CAM software may also be part of the CAD software. Alternatively, instead of CAM software, slicer software may analyze the CAD file to generate the G-code. The slicer software may be commercially available or may be proprietary software. Thus, the CAD file, analyzed by either CAM or slicer software results in G-code. The G-code controls the CNC.

CNC 420 executes G-code to rough and fine mill the part/die produced by metal deposition system 410. In certain embodiments, both the metal deposition system 410 and CNC 420 are controlled by G-code. In certain embodiments, the metal deposition system 410 and CNC 420 are controlled by a single controller executing G-code. Thus, the user does not need to switch systems to perform the synthesis and milling operations controlled by metal deposition system 410 and CNC 420. In certain embodiments, each system is controlled by a separate controller.

After the CNC 420 has milled the part/die, the part/die is subject to hardening by a hardener 430. Hardening includes induction hardening, in which the part/die is heated through induction and then the part/die is quenched. A person of skill will understand that other types of hardening may also be used, including air-hardening, cryogenic hardening, differential hardening, diffusion hardening, fire hardening, laser hardening, shock hardening, and work hardening.

From hardener 430, the part/die is used by tool 440 to synthesis parts. In certain embodiments, tool 440 is a press that uses a die to press parts. Tool 440 used a die to shape and cut metal into parts. In certain embodiments, the die is mounted into a press. Metal sheet or blanks are fed into tool 440 to produce parts. A person of skill in the art would understand that tool 440 uses the die in different ways to produce parts from the die, as long as the die is used in a repeatable way to make parts.

In certain embodiments, tool 440 is a hot stamping press. In certain embodiments, a blank is heated to cause it to be malleable. The blank is then placed in the press for stamping the die and fabricating the part. In certain embodiments, post processing, such as a controlled press hardening or "quenching" process is performed.

In certain embodiments, tool 440 is used to form metal, composite, or plastic parts that are within desired tolerance levels. In certain embodiments, tool 440 is a plastic molder used to form plastic parts using plastic molding. In certain embodiments, tool 440 uses the die as a cast to form metal or composite parts.

Parts that result from tool 440 are trimmed by laser trimmer 450. Laser trimmer 450 is used to cut the part from the production sheet or trim the dimensions of the part. Laser trimmer is also used to add features to the part, such as a hole or cutout into a part. Laser trimming or laser cutting uses a laser to cut materials. In certain embodiments, laser trimmer 450 uses optics to direct a high-power laser to the desired location. In certain embodiments, laser trimmer 450 is controlled by a CNC executing G-code, as described above. In certain embodiments, laser trimmer 450 is under direct user control.

Either the CNC executing G-code or the user direct the part or the laser to the desired location. In certain embodiments, a CNC executing G-code moves the laser (or alternatively the part) such that the desired pattern is cut into the material.

After the part has been trimmed by the laser trimmer 450, the part is scanned by scanner 460. In certain embodiments, scanner 460 is a blue light scanner. In certain embodiments, scanner 460 is an optical measuring machine, optical 3D scanner, white light 3D scanner, blue light laser scanner, non-contact 3D scanner, or other type of scanner for measuring the dimensions of a part, including a coordinate measuring machine ("CMM") or a laser scanner.

In certain embodiments, scanner 460 works based on the principles of triangulation. Scanner 460 comprises a projector that projects a fringe pattern across the surface of the part. During repeated scans, the pattern shifts across the part, and two cameras capture the displacement. The data captured by the cameras is then used to calculate the 3D coordinate measurements.

In certain embodiments, the results of scanner 460 are used to verify whether the fabricated part is within the predefined tolerance levels. In certain embodiments, these predefined tolerance levels are specified using CAD software. In certain embodiments, the predefined tolerance levels are contained in the G-code. If the fabricated part is within predefined tolerance levels, then the part may be used in further production, such as the production of an automobile. If it is not, the dimension of the die used to make the part may need to be altered. In certain embodiments, the die is altered by adding or subtracting material from the original die used to make the part. In other embodiments, the data from the scanner 460 is used to change the design of the die and a new die is fabricated. The process of making a die, then using the die to make a part, and finally verifying whether the part meets necessary tolerances may be repeated until the part meets the necessary tolerance levels.

Each element of FIG. 4 (the metal deposition system 410, the CNC 420, the hardener 430, the tool 440, the laser trimmer 450, and the scanner 460) may be under control of computer 100. In certain embodiments, a computer is connected to each element, or a group of elements to control the individual element of the group of elements.

The metal may be applied using different deposition techniques. Deposition techniques include powder bed deposition, laser metal powder deposition, electric beam wire deposition and electron beam powder bed build technique.

For example, powder bed deposition may be used. Powder bed deposition allows for deposition rates of approximately 0.2 kg/hr, a resolution of approximately 30 microns, and a maximum build volume of roughly 600×400×500 mm.

The powder bed process may use the different techniques to sinter together the metal particles, include direct metal laser sintering ("DMLS") and electron beam melting ("EBM"). In DMLS, there is a heat source, such as a laser, to fuse the material, a method to control the heat source (such as a computer), and a mechanism to add new layers of unused powder material over previously formed layers. In the DMLS process, the powder material is sintered layer by layer, and different engineering metals may be used in the process.

In EBM, an electron beam is used as the heat source to melt the metal powder when adding layers to the forming part or die. Electromagnetic coils may be used to control the beam. A computer may be used to control the electromagnetic coils. EBM typically operates under a reduced pressure, relative to atmospheric pressure.

In both DMLS and EBM, post processing includes removing excess powder and further cleaning the fabricated part or die. Post processing can include melting of the fabricated part/die or hot isotactic pressing to increase the density. However, both typically result in alterations of the dimensions.

Figure 6:
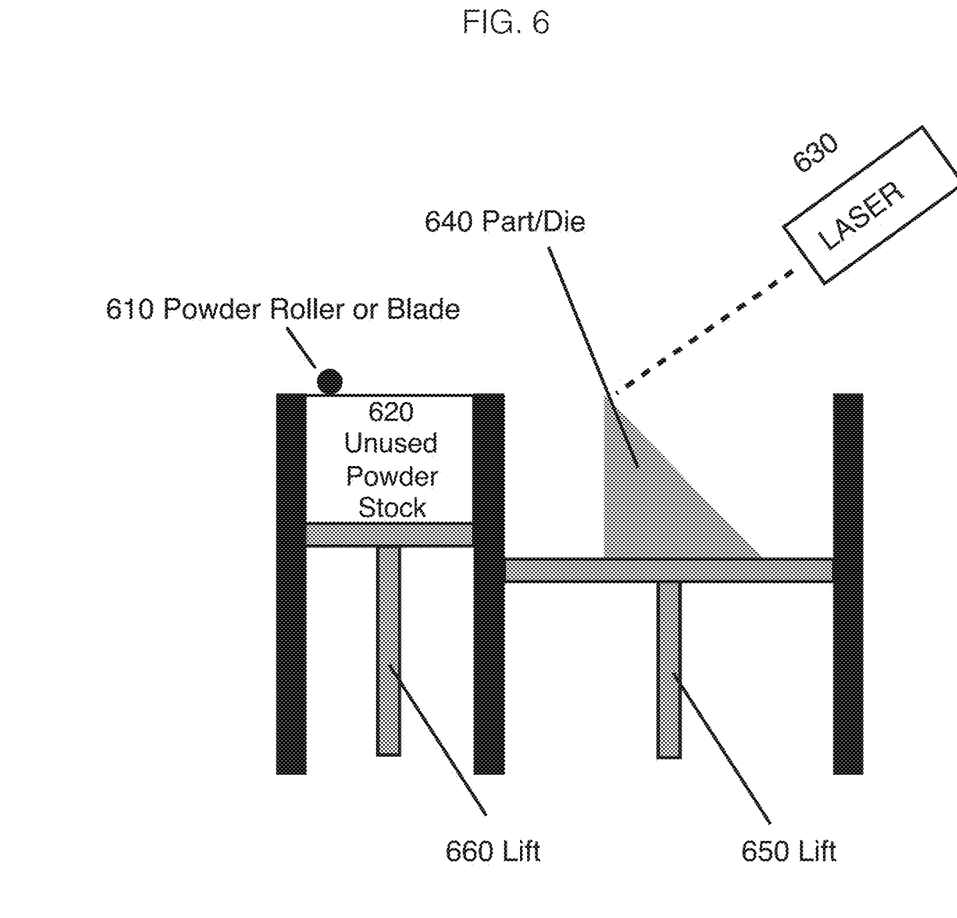
FIG. 6 is a block diagram of an exemplary powder bed system that can be used practice certain embodiments of the present invention.

FIG. 6 is a block diagram of an exemplary powder bed system that can be used practice certain embodiments of the present invention. In certain embodiments, when forming parts or dies using a powder bed system, a layer of unused powder stock 620, which typically can be 0.1 mm thick, but can be as thin as 30 microns, is spread over the build platform. A laser 630 melts and fuses the first layer or first cross section of the model. To form subsequent layers, a lift 660 raises the unused powder stock 620 so that a powder roller or blade 610 can push additional metal powder over a part or die 640. After a thin layer has been spread over the previous layer of the part or die 640, laser 630 fuses the cross section. As additional layers are added, a lift 650 may move down to allow additional room for the part or die. The process of adding a thin layer of powder and melting the powder using laser 630 is repeated until the entire part or die is fabricated. Any unsintered, loose powder is removed during post processing.

Figure 8A:
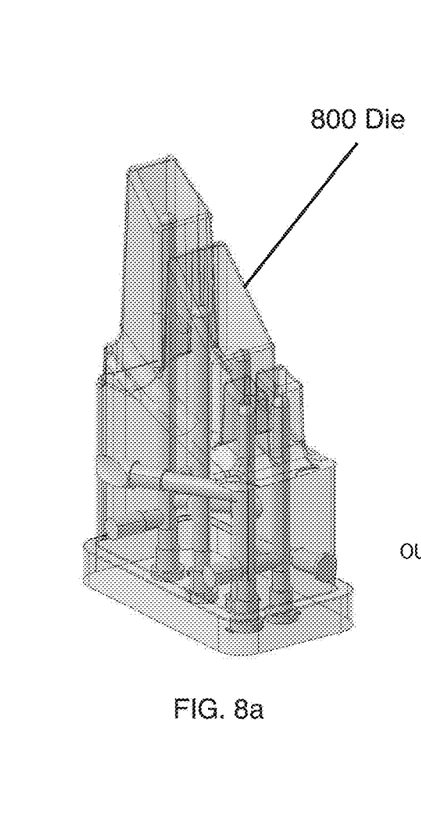
FIG. 8a is a schematic illustration of a die with conventional cooling lines according to certain embodiments of the present invention.
Figure 8B:
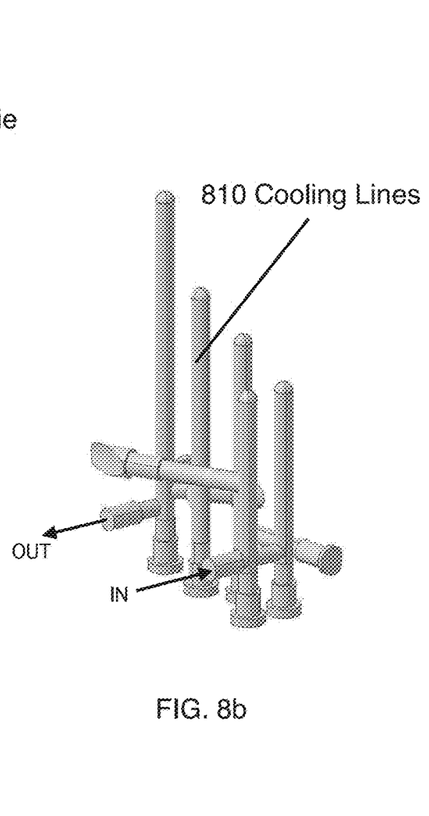
FIG. 8b is a schematic illustration of conventional cooling lines.
Figures 8C, 8D:
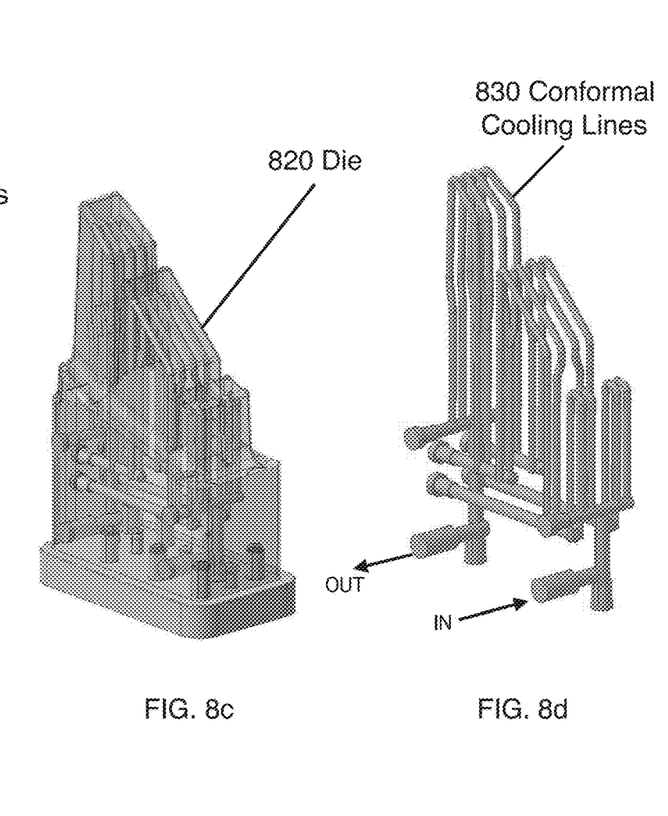
FIG. 8c is a schematic illustration of a die with conformal cooling lines according to certain embodiments of the present invention.
FIG. 8d is a schematic illustration of conformal cooling lines according to certain embodiments of the present invention.

FIGS. 8a and 8c are schematic illustrations of a die with cooling lines and a die with conformal cooling lines according to certain embodiments of the present invention. Conventional techniques use straight-line cooling channels as shown in FIGS. 8a and 8b. FIG. 8b shows cooling lines 810. FIG. 8d shows conformal cooling lines 830. Cooling lines 810 are generally straight lines, while cooling lines 830 contain curves and are more closely able to follow the contours of part/die 820 that is formed around conformal cooling lines 830. Conversely, conventional cooling lines 810 do not have any curves and thus do not contour as closely to part/die 800. The better contour of conformal cooling lines 830 to the part/die can lead to decreased cooling time over the use of cooling lines 810.

In certain embodiments, conformal cooling lines 830 may be a pre-formed material around which the part/die is formed. In certain embodiments, conformal cooling lines 830 are not a pre-formed material. Rather, conformal cooling lines 830 are incorporated into the design of the part/die in the design phase and then a metal deposition system is used to print the desired metal part/die as described herein in this disclosure.

Conformal cooling lines 830 allow for more uniform cooling and diminished stress on the part/die. When the metal part/die does not cool uniformly, thermal stresses occur and the metal part/die may relieve the stress through unwanted cracking. Cracking renders the part/die useless. In addition, conformal cooling lines allow the parts to cool more rapidly, thus reducing design cycle times, meaning faster design iterations are possible.

The cooling ability of conformal cooling lines may produce better cooling performance than conventional cooling lines under the same processing conditions. Conformal cooling lines perform better to dissipate heat content from the part/die than do the conventional cooling lines in tests. To test the performance of conformal cooling lines compared to conventional cooling lines, simulations were performed in which a metal melt was cast using a mold around (1) the conventional cooling lines and (2) the conformal cooling lines. The results of the simulations showed that the conformal cooling lines performed better than the conventional cooling lines. Prior to water spray, the conformal cooling lines caused the surrounding part/die to be more than 100° C. cooler than the part/die formed around the conventional cooling lines. After water spray, the conformal cooling lines caused the surrounding part/die to be approximately 80° C. cooler than the part/die formed around the conventional cooling lines. Using the disclosed process to create conformal cooling lines can help prevent cracking by allowing cooling to occur in a more uniform manner and also reduce cooling times. This is turn causes a reduction in the manufacturing time to create manufactured or stamped parts.

FIG. 2 illustrates the basic components of a battery powered electric vehicle (electric vehicle) 200. The electric vehicle 200 includes at least one drive motor (traction motor) 202A and/or 202B, at least one gear box 204A and/or 204B coupled to a corresponding drive motor 202A and/or 202B, a battery 206 and electronics 208. Generally, the battery 206 provides electricity to power electronics of the electric vehicle 200 and to propel the electric vehicle 200 using the drive motor 202A and/or 202B. The electric vehicle 200 includes a large number of other components that are not described herein but known to one or ordinary skill. While the construct of the electric vehicle 200 of FIG. 2 is shown to have four wheels, differing electric vehicles may have fewer or more than four wheels. Further, differing types of electric vehicles 200 may incorporate the inventive concepts described herein, including motor cycles, aircraft, trucks, boats, train engines, among other types of vehicles. Certain parts created using embodiments of the present invention may be used in vehicle 200.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Any reference to "part/die" or "die/part" in this disclosure is intended to convey that the disclosure applies to both a part and to a die.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically specified.

What is claimed is:

1. A method for synthesizing parts using a die comprising:
providing a three-dimensional model;
converting the three-dimensional model into G-code;
executing the G-code to deposit a metal die;
after the metal die is deposited, measuring one or more dimensions of the metal die;
determining whether the measured one or more dimensions of the metal die are within predetermined tolerance levels;
based on the determination, milling the die if the one or more dimensions are not within predetermined tolerance levels or
depositing additional metal if the one or more dimensions are not within predetermined tolerance levels; and
synthesizing a part using the metal die.

2. The method of claim 1, wherein the metal die is deposited by electron beam wire deposition.

3. The method of claim 1, wherein the metal die is deposited by power bed technology.

4. The method of claim 1, wherein the metal die is deposited by laser metal powder deposition.

5. The method of claim 1, wherein the metal die is deposited by three-dimensional printing.

6. The method of claim 1, wherein synthesizing a part using the metal die comprises using the die as a stamp.

7. The method of claim 1, further comprising depositing an outer layer that has a greater hardness than the deposited metal.

8. The method of claim 1, wherein the three-dimensional model comprises conformal cooling lines.

9. The method of claim 1, wherein the part is an automobile part.

10. The method of claim 1, further comprising:
after the part is synthesized using the metal die, measuring one or more dimensions of the synthesized part;
determining whether the measured one or more dimensions of the synthesized part are within predetermined tolerance levels; and
based on the determination, milling the die if the one or more dimensions of the synthesized part are not within predetermined tolerance levels, or
depositing additional metal on the metal die if the one or more dimensions of the synthesized part are not within the predetermined tolerance levels.

11. The method of claim 1, further comprising:
after the part is synthesized using the metal die, measuring one or more dimensions of the synthesized part;
determining whether the measured one or more dimensions of the synthesized part are within predetermined tolerance levels;
based on the determination, changing the three-dimensional model of the metal die to a new three-dimensional model of the metal die in response to the one or more dimensions of the synthesized part;
converting the new three-dimensional model of the metal die into new G-code; and
executing the new G-code to deposit a new metal die.

12. A system for synthesizing parts using a die comprising:
a metal deposition sub-system configured to convert a three-dimensional model into G-code and execute the G-code to deposit a metal die;
a mill for milling the metal die configured to remove excess metal;
a coordinate measuring machine configured to measure one or more dimensions of the milled metal die and, based on the measuring, determine whether the one or more dimensions are within predetermined tolerance levels; and
a tool configured to synthesize a part using the metal die;
wherein the metal deposition sub-system is further configured to deposit additional metal to the metal die and the mill is further configured to remove material from the metal die until the one or more dimensions are within the predetermined tolerance levels.

13. The system of claim 12, wherein the metal deposition sub-system deposits the metal die by electron beam wire deposition.

14. The system of claim 12, wherein the metal deposition sub-system deposits the metal die by power bed technology.

15. The system of claim 12, wherein the metal deposition sub-system deposits the metal die by laser metal powder deposition.

16. The system of claim 12, wherein the metal deposition sub-system deposits the metal die by three-dimensional printing.

17. The system of claim 12, wherein the tool is a press.

18. The system of claim 12, wherein the metal deposition system is further configured to deposit an outer layer that has a greater hardness than the deposited metal.

19. The system of claim 12, wherein the three-dimensional model comprises conformal cooling lines.

20. The system of claim 12, wherein the part is an automobile part.

21. The system of claim 20, wherein the part comprises a motor housing.

22. The system of claim 12, wherein the metal deposition sub-system comprises a hardware controller and deposition components.

23. A method for synthesizing a metal die comprising:
- converting a three-dimensional model into G-code;
- providing the G-code to a metal deposition system;
- executing the G-code to cause the metal deposition system to deposit a metal die;
- milling the metal die to remove excess metal;
- after the metal die is deposited, measuring one or more dimensions of the metal die;
- determining whether the measured one or more dimensions of the metal die are outside predetermined tolerance levels; and
- based on the determining, milling the metal die if the one or more dimensions exceed a one or more predetermined dimensions or
- depositing additional metal if the one or more dimensions are smaller than the one or more predetermined dimensions.

* * * * *